Figure 1:
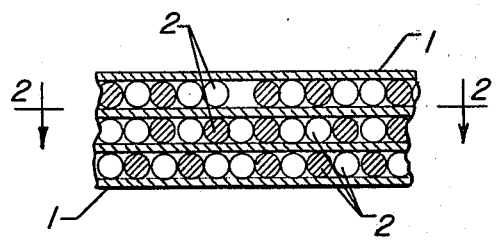

United States Patent [19]
Hervert

[11] 3,948,810
[45] Apr. 6, 1976

[54] MONOLITHIC CATALYST SUPPORT MEMBER

[75] Inventor: George L. Hervert, Woodstock, Ill.

[73] Assignee: Universal Oil Products Company, Des Plaines, Ill.

[22] Filed: July 23, 1974

[21] Appl. No.: 491,007

[52] U.S. Cl............................................. 252/477 R
[51] Int. Cl.² ......................................... B01J 35/02
[58] Field of Search.............. 252/477 R; 23/288 FC

[56] References Cited
UNITED STATES PATENTS
3,528,783   9/1970   Haselden.......................... 252/477 R
3,785,781   1/1974   Hervert et al.................... 252/477 R

*Primary Examiner*—W. J. Shine
*Attorney, Agent, or Firm*—James R. Hoatson, Jr.; Philip T. Liggett; William H. Page, II

[57] ABSTRACT

A rigid monolithic catalyst support member is formed by having substantially round pellets of ceramic, or other refractory material, positioned in a staggered or random manner between spaced apart rigid sheetlike members such that there will be a turbulent fluid flow for a stream passing between the layers of such sheetlike members. Typically, the support materials will be of the same type of materials used for making the refractory "honeycomb" members, such as petalite, cordierite, alumina-silicates, alumina-silica-magnesia, zircon-mullite, alpha-alumina, etc.

7 Claims, 5 Drawing Figures

U.S. Patent April 6, 1976     3,948,810

MONOLITHIC CATALYST SUPPORT MEMBER

The present invention relates to a special form of rigid refractory honeycomb or skeletal ceramic type of element which is temperature resistant and sufficiently porous as to provide a support for a catalyst coating.

More particularly, the present support element is formed by integrating uniformly sized spheres, or substantially round pellets, between spaced layers of sheet-like members such that the resulting support element will provide a tortuous turbulent flow path for a fluid stream passing between the layers of the element.

The present special form of refractory member is also of particular value in providing a rigid catalyst support member for use in automobile catalytic converters to treat auto exhaust gases.

Catalytic materials for chemical and petroleum processing, as well as for auto exhaust gas converters, have been prepared in many forms, including powders, balls, small spheres, micor-spheres, shaped pellets, etc., and also have been used in various types of arrangements including: single beds, spaced beds, annular beds, suspensions, and the like. Small spheres in the 1/16 inch to ¼ inch range are widely used since they are readily prepared commercially to have high surface area, low bulk density and can be coated to have high activity. However, in conducting field testing of automobile exhaust gas catalytic converters, it has been observed that many converters "fail" from catalyst losses due to catalyst breakage and/or attrition. The breakage and attrition or abrasion of particles is generally due to the loosening of the catalyst particles in the bed and the resulting relatively free movement of individual particles. The looseness may result from catalyst breakage caused by expansion and contraction movements of a metal converter housing as well as from warpage of perforated plates or screens which are used to retain the catalyst in the housing. With some catalysts, there also may be some initial shrinkage of the finished catalyst after being subjected to high temperature operating conditions. It has also been found that most of the catalyst movement in a converter bed, after some looseness does occur, is primarily due to the pulsating engine exhaust gas stream although some movement is, of course, due to engine vibrations and road roughness.

In order to overcome the problem of catalyst pill and pellet breakage problems, there have been experimental and commercial usage of rigid honeycomb and skeletal types of elements. As examples, reference may be made to U.S. Pat. Nos. 3,344,925 and 3,505,030. The latter patent, in turn, provides a summary description of various shapes and various methods of manufacturing the skeletal elements, as well as set forth still other U.S. and foreign patents which disclose methods of preparing honeycomb type ceramic elements. From these patents, as well as from other descriptive material, it will be noted that each skeletal member or element has a multiplicity of straight-through, parallel channels whether having openings from an extrusion operation or passageways formed from the use of corrugated layers. As a result, there is laminar flow for a reactant stream and a loss of conversion efficiency due to the inadequate contact between the catalytically coated surfaces of the channels and the stream to be converted. Conversely, a converter utilizing a bed of catalyst pills or pellets will provide turbulence and a highly efficient contact between the reactant stream and the catalyst surfaces. The need of a thick catalyst bed of spheres or pellets can, of course, with certain streams, present an undesirable aspect of causing an excessive pressure drop through the bed.

In any event, it may be considered a principal object of the present invention to provide an improved form of ceramic type converter element which will have structural rigidity and, at the same time, obviate the problem of the straight-through, unidirectional, parallel channels.

As another object of the invention, there is provided the benefit of staggered or randomly placed pills in combination with spaced apart sheet members to form rigid ceramic catalyst support elements such that greater turbulence and surface contact efficiency can take place.

In a broad embodiment, the present invention provides a monolithic catalyst support member which comprises in combination, a plurality of spaced apart rigid ceramic sheet members and a multiplicity of substantially round pellets of rigid refractory material affixed to and, in turn, spaced apart between said spaced sheet members, with such round pellets being positioned in a manner other than in non-staggered rows to thereby provide turbulent fluid flow for a stream passing between the sheet members.

In another embodiment, the present invention provides a catalytic converter for effecting the conversion of a waste gas stream, which comprises in combination: (a) a housing with gas inlet means to one end thereof and a gas outlet means from the other end thereof, and (b) at least one rigid refractory honeycomb type of ceramic element with a conversion catalyst coating thereon positioned within said housing to provide for turbulent gas flow therethrough from said gas inlet means to said gas outlet means, with (c) said ceramic element formed of spaced apart sheet members and a multiplicity of substantially round members of rigid refractory material affixed to and, in turn, spaced apart between said spaced sheet members in a manner other than in non-staggered rows, whereby there is a desired resulting turbulent flow for the gas stream passing between the sheet members.

It is not intended to limit the invention to the use of any one particular type of ceramic material or to any one shape for the resulting honeycomb cross section. There are various compositions for the honeycomb or skeletal structural support materials and such structures may comprise alpha-alumina, alumina-silica-magnesia, zirconia-silicate, zircon-mullite, and the like. Actually, other refractory crystalline ceramic materials which may be formed into honeycombs or rigid skeletal structures and which are utilizable may comprise sillimanite, zircon, petalite, spondumene, cordierite, and alumina-silicates. Various of the skeletal ceramic materials are presently on the market, as for example, ThermaComb corrugated ceramics made by the American Lava Corporation, a subsidiary of 3M Corporation. Also, the E. I. DuPont, Inc. organization provides commercial types of honeycomb elements. The aforementioned U.S. Pat. Nos. 3,344,925 and 3,505,030 describe various types of materials and methods of making honeycomb structures such that reference may be made to these patents for more detailed descriptions of methods of preparation, as well as composition.

Typically, the present improved ceramic honeycomb elements will have both the sheet members and the round pills or spheres provided of the same type of composition, with the same general characteristics of coefficient of expansion, etc., such that the spacing pills will become fused with the sheet-like members and provide a rigid structure. However, the randomly spaced spherical pieces placed between the spaced apart sheet members may be of a hard refractory material other than a ceramic, as long as there is the capability to become fused and fixedly held between the sheet members and not have a greatly different coefficient of expansion. For example, relatively hard catalyst support spheres made from alumina, silica, silica-alumina, alumina-magnesia, etc., or other inorganic oxides, may well be utilized, particularly, catalyst support pills which are of relatively high bulk density or have been hardened or stabilized with additive materials such as barium or other alkaline earth components.

Typically, the honeycomb element may be formed by utilizing a plurality of spaced apart flat sheet members of ceramic material along with the utilization of staggeredly positioned or randomly placed spheres between sheet members such that there is a desired resulting turbulent flow for any fluid stream passing through the element. On the other hand, the element may be formed from a plurality of concentric ceramic members spaced apart by the multiplicity of spheres or round pellet members of additional ceramic material or of the hardened refractory inorganic oxide materials such that again there is the resulting turbulence for any fluid stream that will pass through the concentric members of the element. In still another arrangement, there can be the spiral winding of one or more sheets of ceramic material with each winding being around a multiplicity of pills or spherical ceramic pieces such that there is spacing between windings in the resulting element and a resulting turbulent fluid flow for a stream that will pass through the helical element and around the multiplicity of spacing spherical members.

When using the resulting element in a reactor or catalytic converter, there will, of course, be a suitable catalytic coating applied to the structural support element prior to its being placed in the particular reactor or converter chamber. The catalytic coating, where the element is to be used in an oxidation reaction, may include metals of Group IIA, IB, VB, VIB, VIIB and VIII and particularly copper, silica, vanadium, chromium, iron, cobalt, nickel, platinum, palladium, rhodium, ruthenium, etc., with the components being used singly or in combination with one or more other active component. The present type of honeycomb support member may also be utilized to carry out reduction operations, as for example, in effecting the reduction of nitrogen oxides in vehicular exhaust gas streams to form the less noxious components of nitrogen and carbon dioxide. Thus, the catalyst coating on the support member may well provide a reducing activity and comprise copper oxide, or copper oxide-cobalt oxide. Other catalytic reducing components may be one or more metals or metal oxides from the iron group of metals, or of Group VII, of the Periodic Table. Actually, in connection with the conversion of engine exhaust gas streams, it may be of advantage to use more than one contact bed in a multiple stage operation, with an active reducing coating on the support element in a first stage and an active oxidation catalytic coating on the support element on a second stage, with air being introduced between the two stages to provide for better oxidizing position in the latter stage.

Reference to the accompanying drawing and the following description thereof will serve to illustrate the present invention as well as set forth additional advantages which may be obtained in connection with the use of this type of construction and arrangement.

FIG. 1 of the drawing is a diagrammatic cross-sectional view indicating the formation of a honeycomb type of element through the use of flat sheet-like members and the spacing thereof with round or spherical pieces fused between the spaced sheet members.

Figure 2:
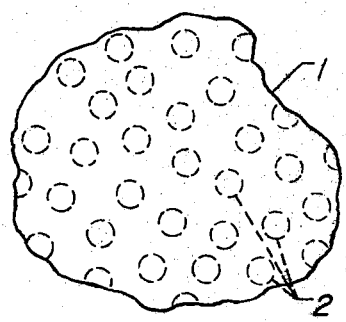

FIG. 2 of the drawing is a plan view of a portion of a honeycomb element, such as indicated by the lines 2—2 in FIG. 1 of the drawing, with the showing of the random positioning of the spherical pieces between the spaced sheet members.

Figure 3:
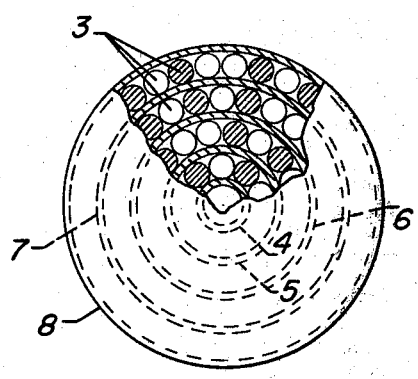

FIG. 3 of the drawing shows, in a partial sectional view, the use of spacing spherical pieces between spaced apart concentric cylinder-like sheets of ceramic material such that there is a resulting cylinder-form honeycomb element.

Figure 4:
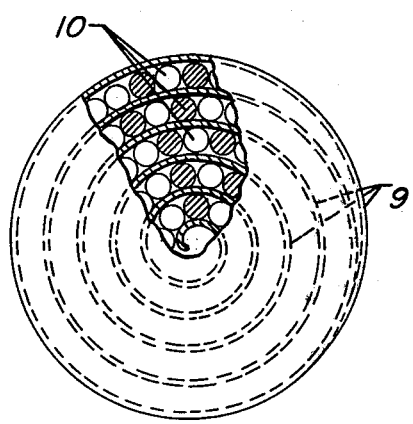

FIG. 4 of the drawing also indicates in a partial sectional view the utilization of randomly spaced round or spherical pieces between the successive layers of a spirally wrapped ceramic sheet material to form a resulting rigid honeycomb element.

Figure 5:
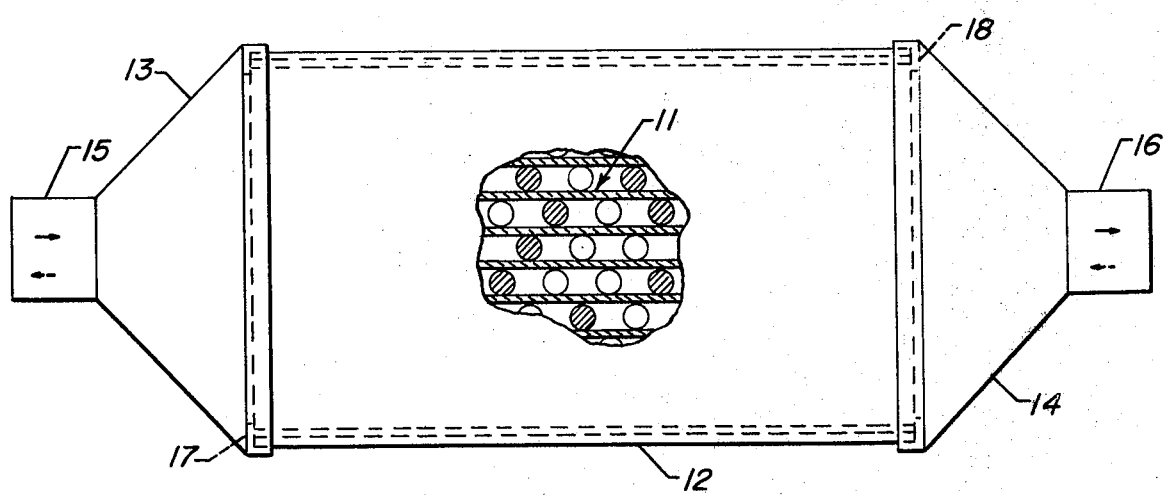

FIG. 5 of the drawing is a diagrammatic elevational view, partially in section, indicating the use of one of the improved types of honeycomb elements within a suitable housing to accommodate a waste gas stream.

Referring now particularly to FIGS. 1 and 2 of the drawing, there is indicated the utilization of a plurality of spaced apart ceramic sheet members 1 and a multiplicity of round or generally spherical ceramic pieces 2 between each sheet member 1 such that there is a resulting honeycomb or rigid skeletal element which can serve to pass a fluid stream through the layers of sheet-like material 1. Any number of sheet members 1 can be utilized to provide a multiplicity of layers and relatively large ceramic elements where such may be desired. The size of the balls or spheres 2 which are used to effect the spacing of sheet members 1 can vary but will be of the same size in any one layer and typically be sized so as to provide spacings between sheets of the order of 1/16 inch to ½ inch, or more, depending upon the type of conversion to take place and pressure drop considerations. It is not believed necessary to describe the actual method of forming the ceramic materials in view of the teachings set forth in the aforementioned patents.

In FIG. 2 of the drawing it will be noted that the multiplicity of generally spherical members 2 have been placed randomly between the flat sheets 1; however, the balls 2 can be positioned in two-way rows as long as they are staggered and will not permit a straight through fluid flow in any one direction. Typically the random positioning of the spheres between the sheets will effect the desired turbulent flow for a stream to be converted in a catalytically activated element. As will be obvious, the number of spheres utilized in each layer, as well as their size, will effect the amount of turbulence and the resulting pressure drop for a particular converter element.

In FIG. 3 of the drawing, there is indicated the utilization of a plurality of balls or spheres 3 of refractory material between a plurality of spaced apart concentric cylinder-like ceramic members indicated at 4, 5, 6, 7 and 8. Here again, the spacing balls 3 will be fused or otherwise rigidly positioned between the spaced apart cylindrical members so as to form a resulting rigid honeycomb member suitable for use as a catalyst support element. The size of the spheres and the spacing between concentric members, as well as a number of concentric members being used, will vary in accordance with the desired size of a finished contacting element.

In FIG. 4 of the drawing there is indicated a formation of a generally round rigid structure formed from the spiral wrapping of a ceramic sheet 9 around a multiplicity of generally round or spherical members 10 such that the latter will effect the spacing for each successive wrapping of sheet 9. Again, the spheres 10 will be positioned between layers of helical wrapping 9 in a random manner or in staggered rows that will effect a staggered positioning within each successive winding whereby there will be turbulent flow for a gas stream being introduced through the resulting support element.

In FIG. 5 of the drawing, there is indicated diagrammatically the placement of a honeycomb element 11 within a cylindrical-form housing 12 which in turn is provided with conical-form end sections 13 and 14. The latter in turn are provided with the respective inlet and outlet means 15 and 16 such that a gaseous stream may be passed through the housing and through the honeycomb element 11.

Various methods of holding the element 11 within the central housing portion 12 at the converter unit may be utilized, as for example by suitable ring members 17 and 18 which are provided internally at the end portions of cylindrical housing section 12 to preclude longitudinal movement of the element 11. Also, where desired, there may be utilized a resilient packing around the element 11 and along the interior wall of central housing section 12 in order that the honeycomb element may better withstand gas pulsations and vehicle jarring under harsh driving conditions. The element 11 will be such as to provide for an end-to-end gas flow through the converter housing and provide for an efficient contact of all of its internal surfaces with the particular gaseous stream so that there is the desired catalytic conversion of the noxious components of the particular stream. The honeycomb configuration may be like any one of those indicated in FIGS. 1, 3 and 4, or may comprise still another configuration resulting from the use of spaced apart sheet-like members and intermediate spacing generally round members between the sheet-like members to permit a tortuous gas passageway therethrough.

It should be noted in the present application that the terms "sheet members" and "sheet-like members" relate to both flat sheets and concentric members, as well as the use of a single sheet in a helical configuration and it is not intended to limit the terms to strictly flat sheet members. The resulting skeletal elements or honeycombs of the present invention will, in each instance, provide greater catalytic efficiency because of the increased turbulence and contact between the gaseous stream and the coated surfaces of the ceramic element. Also, where inorganic refractory oxide pills or spherical members are used in combination with ceramic sheet-like members there can be greater porosity for the spacing spheres such that there is still further increased catalytic activity for the catalytic coated spherical members. In any event, the present improved element provides for the elimination of the generally laminar flows of typical honeycomb types of elements and a greater efficiency for the conversion of any particular reactant stream.

I claim as my invention:

1. A rigid and monolithic catalyst support member which comprises in combination, a plurality of spaced-apart, rigid ceramic sheet members and a multiplicity of substantially round pellets of rigid refractory material positioned in a layer in a spaced-apart manner between said sheet members in which said refractory material is fused to said spaced ceramic sheet members, with said round pellets being staggeredly positioned in said layer to thereby provide turbulent fluid flow for a stream passing between said sheet members.

2. The catalyst support member of claim 1 further characterized in that said spaced sheet members are generally flat.

3. The catalyst support member of claim 1 further characterized in that said spaced sheet members are of a plurality of concentric cylinder-like members.

4. The catalyst support member of claim 1 further characterized in that said spaced sheet members result from the spiral winding of at least one sheet-like member.

5. The catalyst support member of claim 1 further characterized in that said substantially round pellets are of a ceramic material similar to the composition of that of said ceramic sheet members.

6. The catalyst support member of claim 1 further characterized in that said substantially round pellets are of a refractory inorganic oxide material.

7. The catalyst support member of claim 1 further characterized in that said member is provided with an active oxidation catalyst coating suitable for the conversion of an engine exhaust gas stream.

* * * * *